(12) United States Patent
Schoneboom

(10) Patent No.: US 10,830,235 B2
(45) Date of Patent: Nov. 10, 2020

(54) ADAPTIVE CONNECTOR POSITION FOR HIGH/LOW VOLTAGE INVERTER

(71) Applicant: DENSO International America, Inc., Southfield, MI (US)

(72) Inventor: Sean Schoneboom, Bronson, MI (US)

(73) Assignee: DENSO International America, Inc., Southfield, MI (US)

( * ) Notice: Subject to any disclaimer, the term of this patent is extended or adjusted under 35 U.S.C. 154(b) by 184 days.

(21) Appl. No.: 16/250,665

(22) Filed: Jan. 17, 2019

(65) Prior Publication Data

US 2020/0232465 A1   Jul. 23, 2020

(51) Int. Cl.
| | |
|---|---|
| *H02K 5/00* | (2006.01) |
| *H02K 5/15* | (2006.01) |
| *H02K 5/26* | (2006.01) |
| *H02K 1/16* | (2006.01) |
| *F04C 23/00* | (2006.01) |
| *F01C 21/10* | (2006.01) |
| *F04B 39/12* | (2006.01) |
| *H02M 7/00* | (2006.01) |
| *H02M 7/44* | (2006.01) |

(52) U.S. Cl.
CPC ............ *F04C 23/008* (2013.01); *F01C 21/10* (2013.01); *F04B 39/121* (2013.01); *H02M 7/003* (2013.01); *H02M 7/44* (2013.01); *F04C 2240/40* (2013.01); *F04C 2240/803* (2013.01); *F04C 2240/808* (2013.01); *F04C 2270/10* (2013.01); *H02K 1/16* (2013.01); *H02K 5/00* (2013.01); *H02K 5/15* (2013.01); *H02K 5/26* (2013.01)

(58) Field of Classification Search
CPC ............... H02K 1/16; H02K 5/00; H02K 5/16

USPC ..................... 310/89, 216.116, 400, 418–419
See application file for complete search history.

(56) References Cited

U.S. PATENT DOCUMENTS

| | | |
|---|---|---|
| 8,408,883 B2 | 4/2013 | Ichise et al. |
| 8,451,611 B2 | 5/2013 | Nakagami et al. |
| 8,742,709 B2 | 6/2014 | Watanabe et al. |
| 9,309,886 B2 | 4/2016 | Taguchi |
| 9,494,149 B2 | 11/2016 | Watanabe et al. |
| 2010/0028173 A1 | 2/2010 | Ichise et al. |
| 2010/0181876 A1 | 7/2010 | Watanabe et al. |
| 2011/0211980 A1 | 9/2011 | Shibuya et al. |
| 2011/0211981 A1 | 9/2011 | Saito et al. |
| 2015/0340933 A1 | 11/2015 | Hattori et al. |
| 2016/0020680 A1 | 1/2016 | Hattori et al. |

(Continued)

FOREIGN PATENT DOCUMENTS

| | | | |
|---|---|---|---|
| JP | 4510098 B2 | * 7/2010 | |
| WO | WO-2013171957 A1 | * 11/2013 | ............ F04C 23/008 |

*Primary Examiner* — Jose A Gonzalez Quinones
(74) *Attorney, Agent, or Firm* — Harness, Dickey & Pierce, P.L.C.

(57) ABSTRACT

A power inverter for an electric compressor including a rotatable high voltage housing and a rotatable low voltage housing. The rotatable high voltage housing has a high voltage connector, and the rotatable low voltage housing has a low voltage connector. The rotatable low voltage housing and the rotatable high voltage housing are in cooperation with each other. The rotatable low voltage housing and the rotatable high voltage housing are rotatable independent of each other. Each one of the rotatable high voltage housing and the rotatable low voltage housing is independently connectable to an electrical interface of the electric compressor.

20 Claims, 3 Drawing Sheets

(56) References Cited

U.S. PATENT DOCUMENTS

2018/0062476 A1\* 3/2018 Izuka .................... H02K 5/15
2019/0232819 A1\* 8/2019 Hoffmann ............... H02K 5/26

\* cited by examiner

ADAPTIVE CONNECTOR POSITION FOR HIGH/LOW VOLTAGE INVERTER

FIELD

The present disclosure relates to a power inverter for a compressor, the power inverter including rotatable high voltage and low voltage connectors.

BACKGROUND

This section provides background information related to the present disclosure, which is not necessarily prior art.

Packaging an electric compressor with a power inverter presents various challenges dues to the shape of the inverter, limitation of compressor ports, and because different customers often request that the voltage connectors be at different locations for optimal placement in particular applications. Thus while existing power inverters for electric compressors are suitable for their intended use, they are subject to improvement. The present disclosure advantageously includes an improved power inverter for an electric compressor that addresses these issues, as well as various other issues as described herein and as one skilled in the art will appreciate.

SUMMARY

This section provides a general summary of the disclosure, and is not a comprehensive disclosure of its full scope or all of its features.

The present disclosure includes a power inverter for an electric compressor having a rotatable high voltage housing, and a rotatable low voltage housing. The rotatable high voltage housing has a high voltage connector, and the rotatable low voltage housing has a low voltage connector. The rotatable low voltage housing and the rotatable high voltage housing are in cooperation with each other, and are rotatable independent of each other. Each one of the rotatable high voltage housing and the rotatable low voltage housing is independently connectable to an electrical interface of the electric compressor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
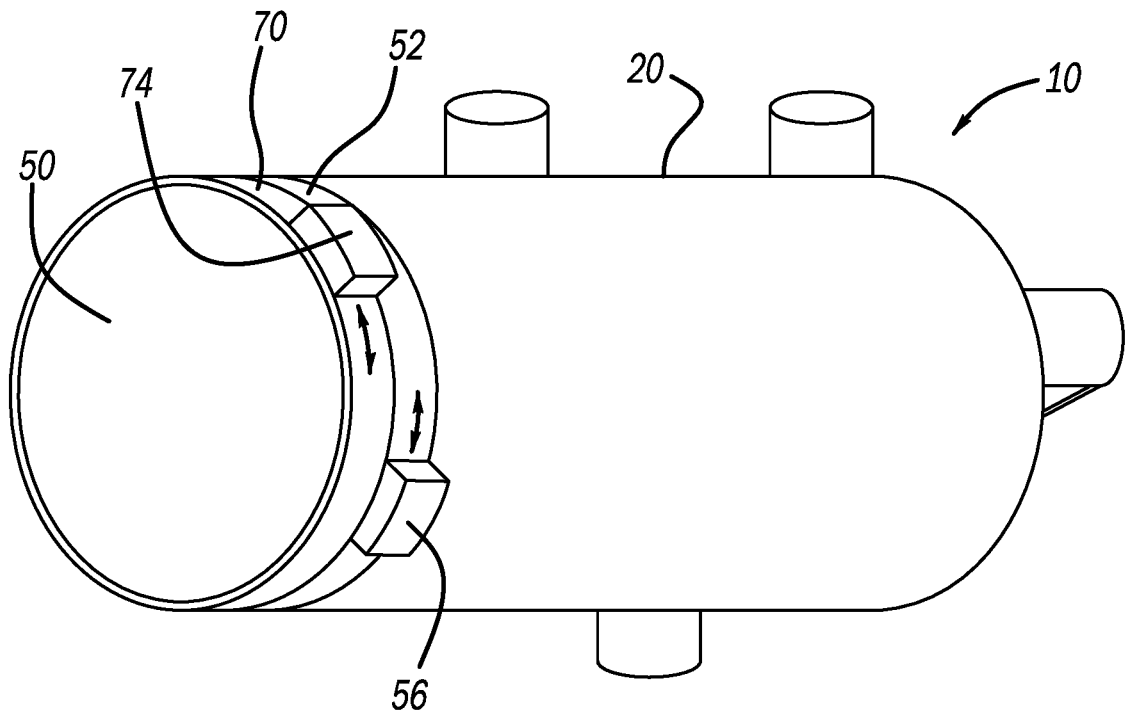
FIG. 1 illustrates a power inverter coupled to an electric compressor in accordance with the present disclosure.

FIG. 1 illustrates an assembly 10 in accordance with the present disclosure including an electric compressor 20 with a power inverter 50 coupled thereto. The electric compressor 20 is any suitable electric compressor. The inverter 50 is any suitable power inverter that changes direct current to alternating current. The power inverter 50 advantageously includes both a relatively high voltage connector 56 and a relatively low voltage connector 74, as described herein.

Figure 2:
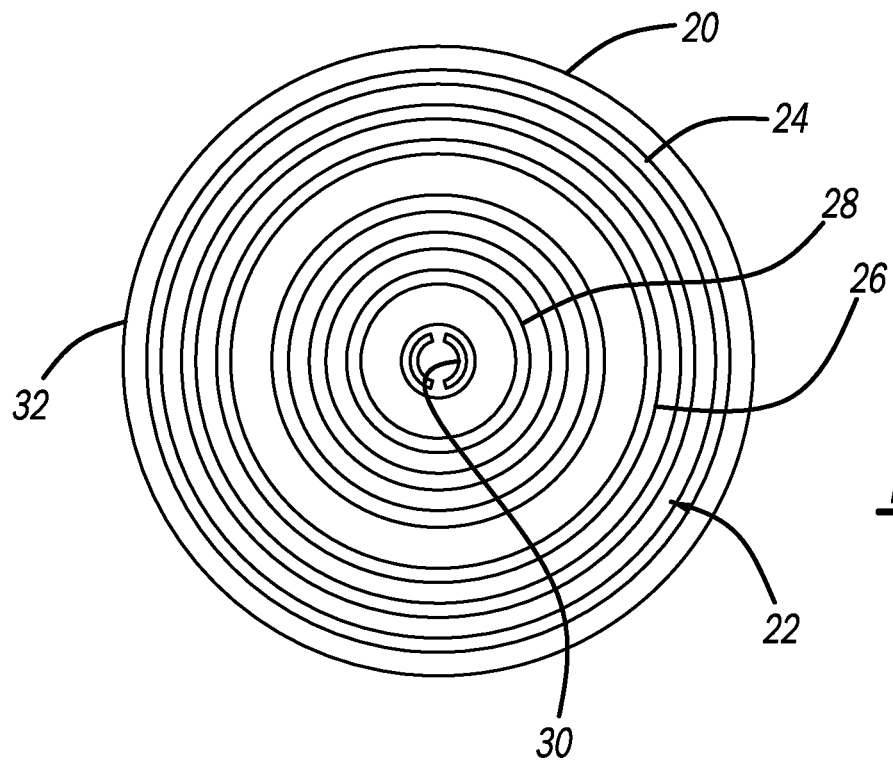
FIG. 2 illustrates an exemplary electrical interface of the compressor.

With additional reference to FIG. 2, the electric compressor 20 includes an electrical interface 22 at an outer end surface 24 of the electric compressor 20. The electrical interface 22 is any suitable electrical interface for electrically connecting the high voltage connector 56 and the low voltage connector 74 to the compressor 20. In the example of FIG. 2, the electrical interface 22 includes a first electrical interface 26, which is an outer, high voltage electrical interface. The electrical interface 22 also includes a second electrical interface 28, which is an inner, low voltage electrical interface. In the example illustrated, the first and second electrical interfaces 26 and 28 are both circular channels at the outer end surface 24. The first electrical interface 26 surrounds the second electrical interface 28. The first and second electrical interfaces 26 and 28 receive, and electrically cooperate with, any suitable electrical interface of the power inverter 50, such as pin connectors 60 and 80 described herein. In other examples, the electrical interface 22 may include pins that cooperate with electrical connection channels of the power inverter 50. The electrical interface 22 may have the form of any other suitable electrical interface as well. For example, in some applications the electrical interface 22 may be any suitable hardwired connection between the compressor 20 and the power inverter 50 that allows the inner housing 52 and the outer housing 70 to each be rotated independently of one another throughout a suitable range, such as 360°.

At a center of the outer end surface 24 and the electrical interface 22 is a center hub 30. At an outer periphery of the outer end surface 24 is an outer flange 32. The center hub 30 and the outer flange 32 cooperate with the inverter 50 to secure the inverter 50 to the compressor 20 in any suitable manner to permit independent rotation of the inner and outer housings 52 and 70, such as described herein. The center hub 30 and the outer flange 32 are merely exemplary connectors for securing the power inverter 50 to the electric compressor 20, and thus any other suitable connections for connecting the compressor 20 and the inverter 50 may be included.

Figure 3:
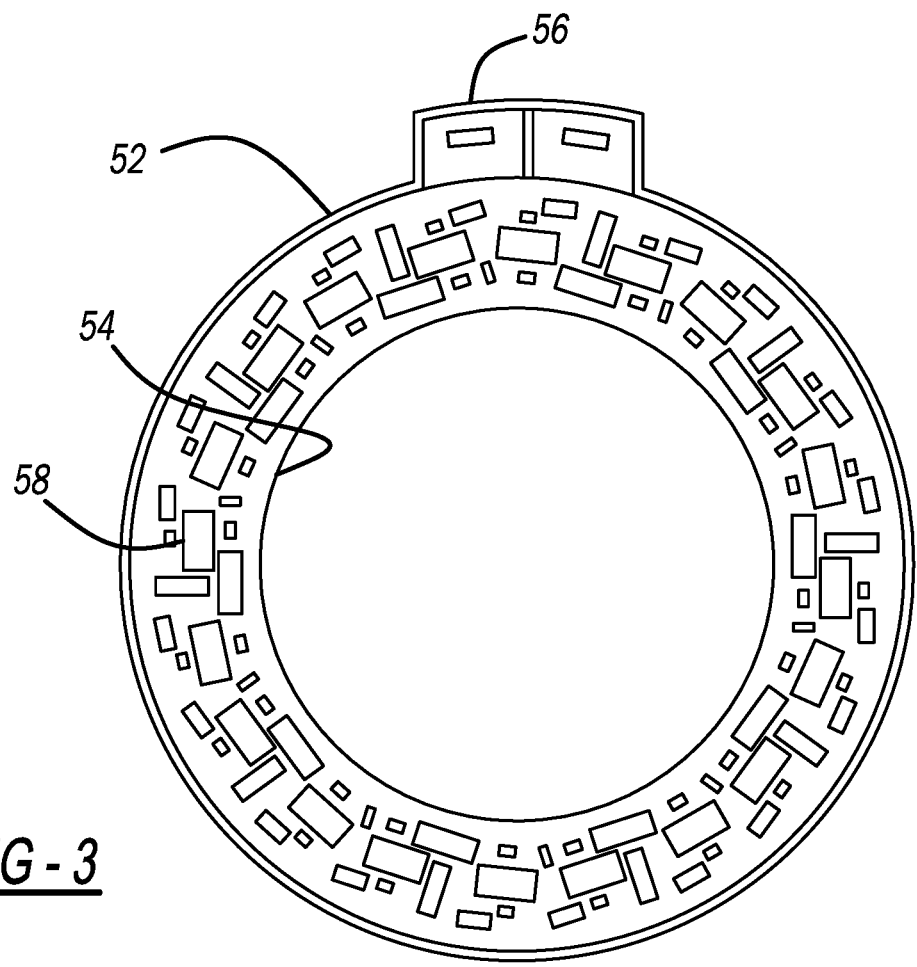
FIG. 3 illustrates an inner housing of the inverter including an inner connector.

With reference to FIG. 3, the inner housing 52 of the power inverter 50 is illustrated. The inner housing 52 is generally an annular housing defining a center aperture or void 54. Extending from the housing 52 is an inner connector 56. The inner connector 56 may be any suitable electrical connector, such as a slim mounted connector suitable for high voltage connection. The connector 56 may also be a wired lead. Although the inner connector 56 is described as a high voltage connector, the inner housing 52 and the inner connector 56 may alternatively be configured as a low voltage housing with a low voltage connector.

Figure 4:
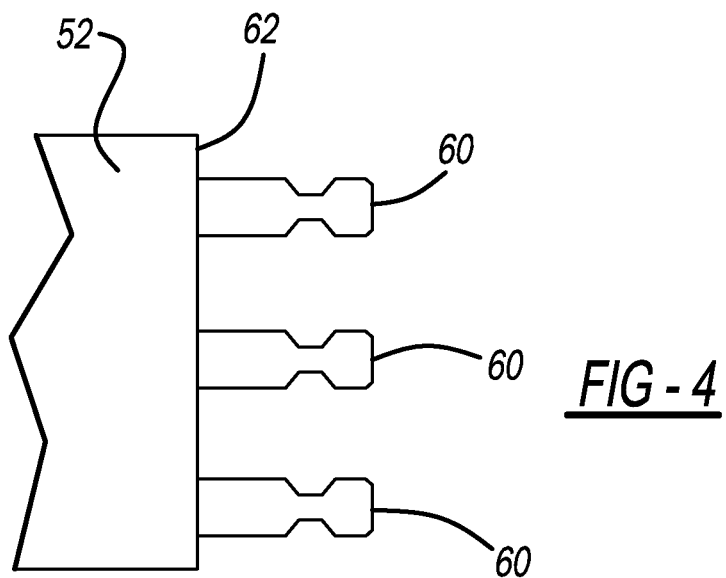
FIG. 4 illustrates an exemplary pin connection of the inner housing for electrically connecting the inner connector to the electrical interface of the compressor.

Extending about the inner housing 52 are electrical components 58 of the inverter 50. The electrical components 58 are any suitable components (such as any suitable circuitry) configured to convert direct current to alternating current, such as high voltage direct current to high voltage alternating current. Extending from the housing 52, and in electrical cooperation with the electrical components 58, is any suitable connector for connecting the electrical components 58 to the electrical interface 22 of the compressor 20. In the example of FIG. 4, a pin connector 60 extends from an inner surface 62 of the inner housing 52. The pins of the pin connector 60 are sized, shaped and arranged to cooperate with the first electrical interface 26 of the electric compressor 20. Thus the pin connector 60 sits within the connector track of the first electrical interface 26. This electrical connection may be reversed, may instead be a hardwired connection, or may be any other suitable electrical connection.

The inner housing 52 is coupled to the outer end surface 24 of the compressor 20 by way of cooperation between an outer edge of the housing 52 and the outer flange 32 of the compressor 20. The inner housing 52 is secured in any suitable manner sufficient to allow the inner housing 52 to rotate 360°. As the inner housing 52 rotates 360°, the electrical connection between the inner housing 52 and the electric compressor 20 is maintained because the pin connector 60 stays in electrical connection with the first electrical interface 26 of the electrical interface 22. The inner housing 52 is advantageously rotatable 360° to locate the inner connector 56 at any suitable position depending on the packaging requirements of a particular application.

Figure 5A:
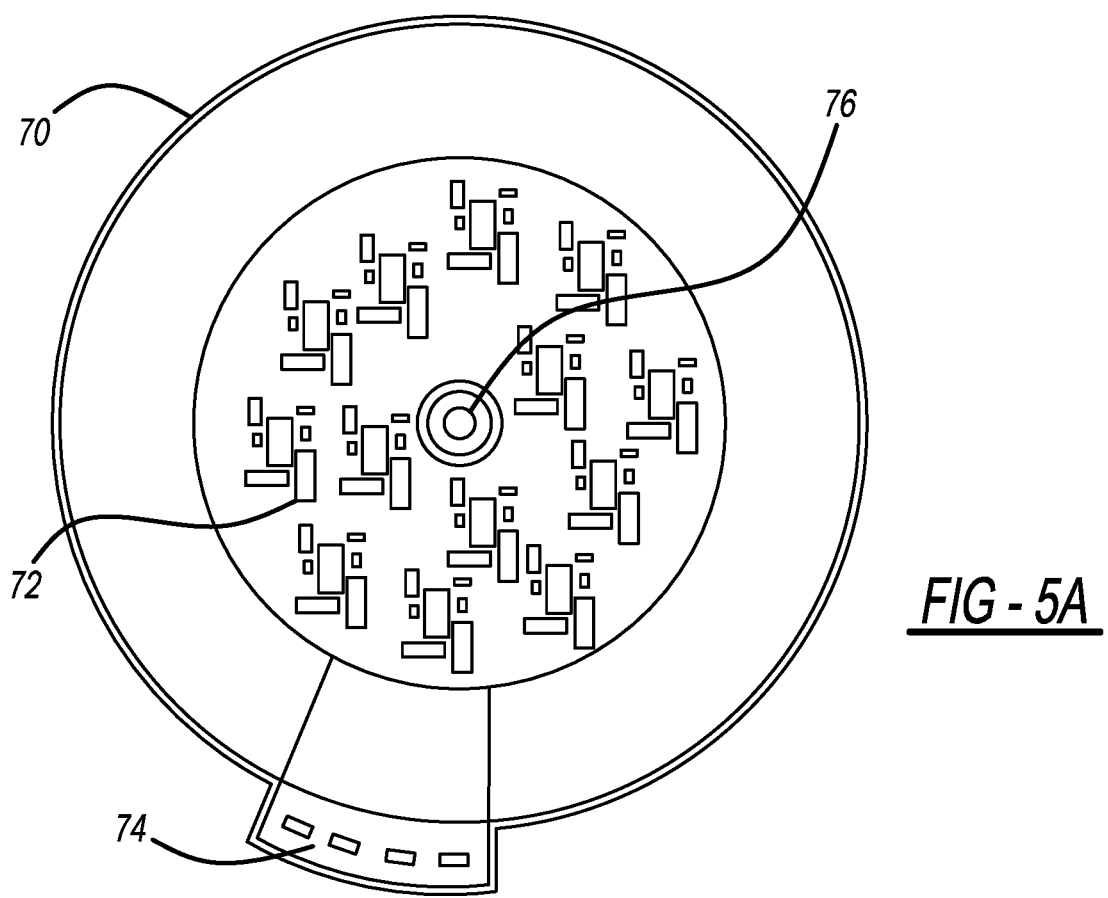
FIG. 5A is a plan view of an outer housing of the inverter including an outer connector.
Figure 5B:
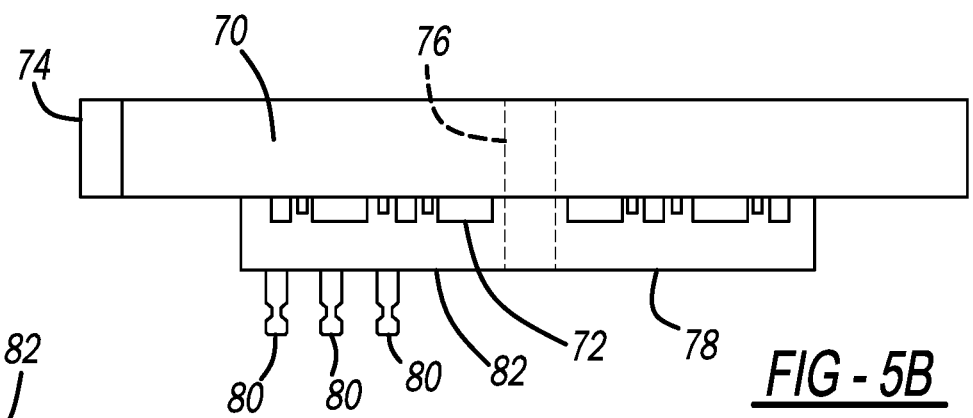
FIG. 5B is a side view of FIG. 5A.

With reference to FIG. 5A, the power inverter 50 further includes an outer housing 70. The outer housing 70 includes electrical components 72 at a center thereof. The electrical components 72 are any suitable components (such as any suitable circuitry) configured to convert direct current to alternating current, such as low voltage direct current to low voltage alternating current. The electrical components 72 can be within a flange 78, as illustrated in FIG. 5B. The flange 78 sits within the center aperture 54 of the inner housing 52, when the outer housing 70 and the inner housing 52 are both connected to the compressor 20.

The outer housing 70 further includes a center retention member 76, which is configured to cooperate with the center hub 30 at the outer end surface 24 of the electric compressor 20 to secure the outer housing 70 to the compressor 20. The outer housing 70 may be secured to the compressor 20 and/or to the inner housing 52 in any other suitable manner as well. The outer housing 70 and the inner housing 52 can each be secured in any manner suitable to permit the housings 52 and 70 to rotate 360° independent of one another and the compressor 20.

Rotation of the outer housing 70 advantageously allows the outer connector 74 to be arranged at any position most suitable for a packaging arrangement of a particular application. The outer connector 74 may be any suitable connector, such as a slim mounted connector or a wired lead. The outer connector 74 may be any suitable relatively low voltage connector when the inner connector 56 is configured as a high voltage connector. Alternatively, the outer connector 74 may be any suitable high voltage connector, and the inner connector 56 may be any suitable low voltage connector.

Figure 6:
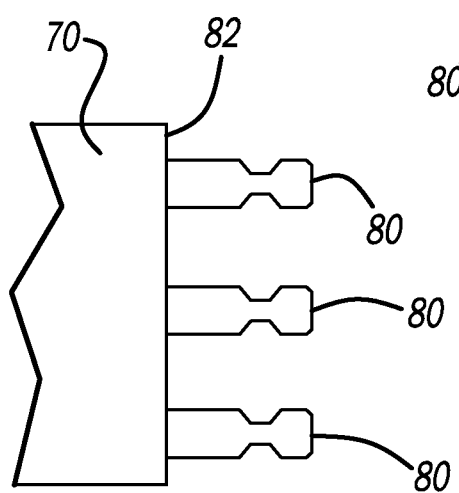
FIG. 6 illustrates an exemplary pin connection of the outer housing for electrically connecting the outer connector to the electrical interface of the compressor.

With reference to FIG. 6, an inner surface 82 of the flange 78 includes a pin connector 80 with pins sized, shaped and arranged to cooperate with the second (inner) circular electrical interface 28 of the electric compressor 20. The pin connector 80 and the second circular electrical interface 28 are complementary such that an electrical connection therebetween is maintained as the outer housing 70 is rotated 360°. In some applications, the pin connector 80 may be included with the outer end surface 24, and the second circular electrical interface 28 may be included at the inner surface 82 of the flange 78. In still other applications, a hardwired connection may be provided between the electrical components 72 and the electrical interface 22 of the electric compressor 20. Any suitable wired interface may be included that is sufficient to permit 360° rotation of the outer housing 70 and the outer connector 74.

The present disclosure thus advantageously provides for a power inverter 50 having both a high voltage connector 56 and a low voltage connector 74. The power inverter 50 is connectable to the electric compressor 20 as described above to allow the inner housing 52 and the outer housing 70 to each rotate 360° independently of one another. As a result, the inner voltage connector 56 and the outer voltage connector 74 may be arranged at any suitable position based on the packaging requirements of a particular application. The inner voltage connector 56 may be a high voltage connector and the outer voltage connector 74 may be a low voltage connector, or vice versa. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power inverter for an electric compressor comprising:
   a rotatable high voltage housing including a high voltage connector;
   a rotatable low voltage housing including a low voltage connector;
   wherein:
      the rotatable low voltage housing and the rotatable high voltage housing are in cooperation with one another;
      the rotatable low voltage housing and the rotatable high voltage housing are rotatable independent of each other; and
      each one of the rotatable high voltage housing and the rotatable low voltage housing is independently connectable to an electrical interface of the electric compressor.

2. The power inverter of claim 1, wherein the rotatable high voltage housing and the rotatable low voltage housing are each independently rotatable 360°.

3. The power inverter of claim 1, wherein a portion of the rotatable low voltage housing is seated within an aperture defined by the rotatable high voltage housing.

4. The power inverter of claim 1, wherein the rotatable high voltage housing is between the rotatable low voltage housing and the compressor when the power inverter is coupled to the compressor.

5. The power inverter of claim 1, further comprising:
   a first pin connector extending from the rotatable high voltage housing, the first pin connector configured to cooperate with a first circular electrical interface of the electric compressor; and
   a second pin connector extending from the rotatable low voltage housing, the second pin connector configured to cooperate with a second circular electrical interface of the electric compressor.

6. The power inverter of claim 5, wherein: the first circular electrical interface of the compressor surrounds the second circular electrical interface of the compressor.

7. The power inverter of claim 1, further comprising:
   a first pin connector extending from the electric compressor, the first pin connector configured to cooperate with a first circular electrical interface of the rotatable high voltage housing; and
   a second pin connector extending from the electric compressor, the second pin connector configured to cooperate with a second circular electrical interface of the rotatable high voltage housing;
   wherein the first circular electrical interface surrounds the second circular electrical interface.

8. A power inverter for an electric compressor comprising:
   a rotatable inner housing including an inner voltage connector;
   a rotatable outer housing including an outer voltage connector;
   wherein:
      the rotatable inner housing and the rotatable outer housing are in cooperation with one another;
      the rotatable inner housing abuts the electric compressor such that the rotatable inner housing is between the rotatable outer housing and the electric compressor;
      the rotatable inner housing and the rotatable outer housing are rotatable independent of each other; and
      each one of the rotatable inner housing and the rotatable outer housing is independently connectable to an electrical interface of the electric compressor.

9. The power inverter of claim 8, wherein each one of the rotatable inner housing and the rotatable outer housing is rotatable 360°.

10. The power inverter of claim 8, wherein the rotatable inner housing defines a center aperture, and a portion of the rotatable outer housing is seated within the center aperture.

11. The power inverter of claim 8, wherein the rotatable inner housing is annular.

12. The power inverter of claim 8, wherein the inner voltage connector is a relatively high voltage connector, and the outer voltage connector is a relatively low voltage connector.

13. The power inverter of claim 8, further comprising:
   a first pin connector extending from the rotatable inner housing, the first pin connector configured to cooperate with a first circular electrical interface of the electric compressor; and
   a second pin connector extending from the rotatable outer housing, the second pin connector configured to cooperate with a second circular electrical interface of the electric compressor.

14. The power inverter of claim 13, wherein: the first circular electrical interface of the compressor surrounds the second circular electrical interface of the compressor.

15. An assembly including an electric compressor with an inverter coupled thereto, the assembly comprising:
   an electrical interface of the electric compressor;
   a rotatable inner housing of the inverter including an inner voltage connector, the rotatable inner housing electrically connected to the electrical interface of the electric compressor;
   a rotatable outer housing of the inverter including an outer voltage connector, the rotatable outer housing electrically connected to the electrical interface of the electric compressor;
   wherein;
      the rotatable inner housing and the rotatable outer housing are in cooperation with one another and rotatable independent of each other; and
      the rotatable inner housing abuts the electric compressor such that the rotatable inner housing is between the rotatable outer housing and the electric compressor.

16. The assembly of claim 15, wherein the inner voltage connector is a high voltage connector, and the outer voltage connector is a low voltage connector; wherein each one of the rotatable inner housing and the rotatable outer housing is rotatable 360°.

17. The assembly of claim 15, wherein the rotatable inner housing defines a center aperture, and a portion of the rotatable outer housing is seated within the center aperture.

18. The assembly of claim 15, wherein the electrical interface of the electric compressor includes a first circular electrical interface and a second circular electrical interface, the first circular electrical interface surrounds the second circular electrical interface.

19. The assembly of claim 18, further comprising:
   a first pin connector extending from the rotatable inner housing, the first pin connector configured to cooperate with the first circular electrical interface of the electric compressor; and
   a second pin connector extending from the rotatable outer housing, the second pin connector configured to cooperate with the second circular electrical interface of the electric compressor.

20. The assembly of claim 15, wherein the electrical interface of the electric compressor includes:
   a first pin connector configured to cooperate with the rotatable inner housing; and
   a second pin connector configured to cooperate with the rotatable outer housing.

* * * * *

UNITED STATES PATENT AND TRADEMARK OFFICE
CERTIFICATE OF CORRECTION

PATENT NO. : 10,830,235 B2  
APPLICATION NO. : 16/250665  
DATED : November 10, 2020  
INVENTOR(S) : Sean Schoneboom Page 1 of 1

It is certified that error appears in the above-identified patent and that said Letters Patent is hereby corrected as shown below:

In the Claims

Column 7, Claim 15, Line 15: delete "wherein;" and insert --wherein:-- therefor

Signed and Sealed this  
Twelfth Day of January, 2021

Andrei Iancu  
*Director of the United States Patent and Trademark Office*